United States Patent
Harms et al.

(10) Patent No.: US 9,533,447 B2
(45) Date of Patent: Jan. 3, 2017

(54) METHOD FOR MANUFACTURING A COMPOSITE WORK PIECE FOR A DRUG DELIVERY DEVICE AND COMPOSITE WORK PIECE FOR A DRUG DELIVERY DEVICE

(75) Inventors: Michael Harms, Frankfurt am Main (DE); Steffen Raab, Frankfurt am Main (DE); Uwe Dasbach, Frankfurt am Main (DE)

(73) Assignee: Sanofi-Aventis Deutschland GmbH, Frankfurt am Main (DE)

( * ) Notice: Subject to any disclaimer, the term of this patent is extended or adjusted under 35 U.S.C. 154(b) by 0 days.

(21) Appl. No.: 13/203,599

(22) PCT Filed: Mar. 31, 2010

(86) PCT No.: PCT/EP2010/054348
§ 371 (c)(1),
(2), (4) Date: Mar. 16, 2012

(87) PCT Pub. No.: WO2010/112562
PCT Pub. Date: Oct. 7, 2010

(65) Prior Publication Data
US 2012/0165738 A1    Jun. 28, 2012

Related U.S. Application Data

(60) Provisional application No. 61/169,871, filed on Apr. 16, 2009.

(30) Foreign Application Priority Data

Mar. 31, 2009    (EP) .................................... 09004671

(51) Int. Cl.
*B29C 65/14*    (2006.01)
*B23K 26/22*    (2006.01)
(Continued)

(52) U.S. Cl.
CPC .............. *B29C 65/14* (2013.01); *B23K 26/22* (2013.01); *B23K 26/282* (2015.10);
(Continued)

(58) Field of Classification Search
CPC ........ A61M 5/178; B32B 37/06; B29C 65/16; B29C 65/565; B29C 65/7814
(Continued)

(56) References Cited

U.S. PATENT DOCUMENTS 5,893,959 A * 4/1999 Muellich .................... 156/272.8
6,221,046 B1 * 4/2001 Burroughs et al. ........... 604/153
(Continued)

FOREIGN PATENT DOCUMENTS

DE    2223603    11/1972
DE    4432081 A1    3/1996
(Continued)

*Primary Examiner* — Daniel McNally
(74) *Attorney, Agent, or Firm* — McDonnell Boehnen Hulbert & Berghoff LLP

(57) ABSTRACT

Method for manufacturing a composite work piece for a drug delivery device, comprising the steps: Providing a first work piece part 1 and a second work piece part 2, arranging both work piece parts 1, 2 with respect to each other in such a way that both work piece parts 1, 2 are in mechanical contact with one another in a contact area 3, irradiating a surface of the first work piece part 1 with electromagnetic radiation, thereby softening the first work piece part 1 and/or the second work piece part 2 in a region adjacent to the contact area 3, and joining the first work piece part 1 to the second work piece part 2 in the contact area 3 for the composite work piece. Furthermore, a composite work piece for a drug delivery device is provided.

11 Claims, 3 Drawing Sheets

Figure 1A:
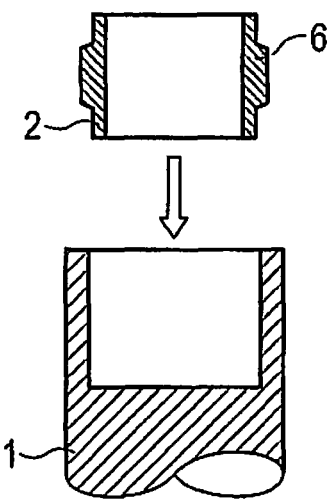

(51) Int. Cl.
    *B29C 65/56*       (2006.01)
    *B29C 65/64*       (2006.01)
    *B29C 65/66*       (2006.01)
    *B29C 65/78*       (2006.01)
    *B29C 65/00*       (2006.01)
    *B29C 65/16*       (2006.01)
    *B29K 705/00*     (2006.01)
    *B29L 31/00*       (2006.01)

(52) U.S. Cl.
    CPC ...... *B29C 65/1435* (2013.01); *B29C 65/1635* (2013.01); *B29C 65/565* (2013.01); *B29C 65/64* (2013.01); *B29C 65/66* (2013.01); *B29C 65/7814* (2013.01); *B29C 65/7855* (2013.01); *B29C 66/1122* (2013.01); *B29C 66/21* (2013.01); *B29C 66/5344* (2013.01); *B29C 66/547* (2013.01); *B29C 66/612* (2013.01); *B29C 66/73115* (2013.01); *B29C 66/73116* (2013.01); *B29C 66/8262* (2013.01); *B23K 2201/06* (2013.01); *B29C 65/1441* (2013.01); *B29C 65/1654* (2013.01); *B29C 65/1677* (2013.01); *B29C 66/1142* (2013.01); *B29C 66/124* (2013.01); *B29C 66/73921* (2013.01); *B29K 2705/00* (2013.01); *B29L 2031/7544* (2013.01)

(58) Field of Classification Search
    USPC   156/272.2, 272.8, 275.1, 293, 294; 604/187
    See application file for complete search history.

(56) References Cited

U.S. PATENT DOCUMENTS

| | | | |
|---|---|---|---|
| 2002/0100540 A1* | 8/2002 | Savitski et al. | 156/157 |
| 2002/0179233 A1* | 12/2002 | Ruotsalainen | 156/272.8 |
| 2003/0125429 A1* | 7/2003 | Joachimi et al. | 524/105 |
| 2005/0133638 A1 | 6/2005 | Hornby | |
| 2007/0123829 A1* | 5/2007 | Atterbury et al. | 604/207 |
| 2007/0144665 A1* | 6/2007 | Daly et al. | 156/272.8 |
| 2011/0094673 A1* | 4/2011 | Daly et al. | 156/272.8 |

FOREIGN PATENT DOCUMENTS

| | | |
|---|---|---|
| EP | 1262304 A1 | 12/2002 |
| FR | 2165906 | 8/1973 |
| WO | 2006034814 A1 | 4/2006 |
| WO | WO 2008068328 A2 * | 6/2008 |

* cited by examiner

METHOD FOR MANUFACTURING A COMPOSITE WORK PIECE FOR A DRUG DELIVERY DEVICE AND COMPOSITE WORK PIECE FOR A DRUG DELIVERY DEVICE

CROSS REFERENCE TO RELATED APPLICATIONS

The present application is a 35 U.S.C. 371 National Application of PCT/EP2010/054348 filed Mar. 31, 2010, which claims priority to European Patent Application No. 09004671.5, filed Mar. 31, 2009, and U.S. Provisional Patent Application No. 61/169,871 filed Apr. 16, 2009 the entire contents of which are incorporated entirely herein by reference.

The present disclosure relates to a method for manufacturing a composite work piece for a drug delivery device and to a composite work piece for a drug delivery device.

One problem in manufacturing a drug delivery device or a work piece for a drug delivery device is that these devices may be small and complex. Nevertheless, they should work reliably.

It is an object of the present disclosure to provide an improved method for manufacturing a drug delivery device or a work piece for a drug delivery device.

One aspect is directed to a method for manufacturing a composite work piece for a drug delivery device. The method may comprise the step of A) providing a first work piece part and a second work piece part. The method may comprise the step of B) arranging both work piece parts with respect to each other in such a way that both work piece parts are in mechanical contact with one another in a contact area. The method may comprise the step of C) irradiating a surface of the first work piece part with electromagnetic radiation, thereby softening the first work piece part and/or the second work piece part in a region adjacent to the contact area. The method may comprise the step of D) reversibly or irreversibly joining the first work piece part to the second work piece part in the contact area for the composite work piece.

Thus, the composite work piece for the drug delivery device is preferably manufactured in a process which comprises four steps A) to D). In the first step A) the first work piece part and the second work piece part are provided. In the second step B) both parts are arranged with respect to each other in such a way, that they are in mechanical contact with each other in a contact area. Both elements may overlap in a large area. The contact area is expediently that area, in which the both work piece parts are in direct contact with each other. In the third step C) the surface of the first work piece part is irradiated with electromagnetic radiation. The first work piece part may be irradiated in step C) on any surface of the first work piece part. Preferably, the surface which is on that side of the first work piece part remote from the second work piece part is irradiated.

Softening may mean that one or both of the parts may be softened until they melt and become liquid. Alternatively softening may mean that the first and/or the second work piece part may be softened without melting.

After having softened one or both work piece parts, the first work piece part is preferably irreversibly joined in step D) to the second work piece part in the contact area to form the composite work piece. After having been joined, the first work piece part and the second work piece part are preferably connected permanently, for example after a curing process, and form a composite work piece.

Therefore in the case of a drug delivery device the work piece parts, e.g. parts of a housing of the device, may be, preferably permanently, connected with each other without directly irradiating the surface of one of the work piece parts. For example, the electromagnetic radiation may radiate through the first work piece part without significant softening this part due to absorption occurring therein. The radiation may be absorbed in the second work piece part. Therefore also parts may be joined to each other when one of the two parts is arranged inside of the device, like the second work piece part in the first work piece part for example.

In the case that both parts are being softened in step D) the softened materials of both parts may mix with each other. A very stable connection between the work piece parts may be formed in this way.

In an embodiment before step C) and after step B), the first work piece part and the second work piece part are held in mechanical contact with each other in the contact area by a force.

The force may be an external force, but it is preferably an internal force. An internal force may be a force that is exerted by one of the two work piece parts onto the other one of the work piece parts without an additionally applied external force. For example, the first work piece part and/or the second work piece part may be under an elastic stress after having been arranged with respect to each other and before they are softened. After having been softened the first work piece part and/or the second work piece part preferably are not under elastic stress in the softened area.

In another embodiment the force is an elastic force which is exerted by one of the work piece parts onto the other one of the work piece parts on account of an elastic deformation, preferably a residual elastic deformation of one or both of the work piece parts.

The force may be an elastic restoring force. The elastic restoring force may result from the elastically deformed work piece part tending to resume its undeformed shape.

In the case that the force is an elastic restoring force, one of the work piece parts applies pressure on the other one of the work piece parts in the contact area. It is also possible that both work piece parts are under elastic stress and, thus, both apply pressure on each other in the contact area.

In another embodiment in step B), the work piece parts are connected to one another via a force-fit connection, preferably a press-fit connection.

In this embodiment both work piece parts apply pressure on one another in the contact area, which for example is the press-fit area. The two parts may be fixed to each other by the force-fit connection. Thus, both work piece parts may be hold in a position ready for being irradiated without additional external means for aligning the work piece parts relative to one another.

In another embodiment the first work piece part is transmissive for the electromagnetic radiation of step C).

In this case, the first work piece part is transmissive for the electromagnetic radiation of step C), the first work piece part may be irradiated in step C) on the surface, which is on the opposite side of the first work piece part compared to that side where the second work piece part is arranged. If the surface of the first work piece part is irradiated which is remote from the second work piece part, the electromagnetic radiation may pass through the first work piece part and reach the surface of the second work piece part, which is expediently in direct contact with the first work piece part. Therefore, the second work piece part may be heated on that surface which is in direct contact with the first work piece part. Accordingly, the first work piece part may be softened by the heat transfer from the second work piece part to that area of the first work piece part in which the first work piece part is in direct contact with the second work piece part. For example, both, the first and the second work piece part, may be softened in the area in which both parts are kept in contact with each other. Thus, it is possible that the materials which both work piece parts are made of may intermix with one another. After curing both parts are in a permanent connection with each other that may resist even strong mechanical forces.

There is also another embodiment in which the first work piece part is only partly transmissive for the electromagnetic radiation of step C), but the first work piece part also partly absorbs the electromagnetic radiation of step C). In this case it is possible that only the first part is being softened by the electromagnetic radiation, and for example for the second work piece part a material may be used which reflects the electromagnetic radiation of step C). Thereby, the radiation power absorbed in the first work piece part may be increased.

In another embodiment the first work piece part comprises a black pigment.

The black pigment may be chosen in a way that it matches to the electromagnetic radiation so that it does not absorb the whole electromagnetic radiation of step C). So it is possible that the first part which may be, for example, arranged on or form the outer surface of the drug delivery device looks black for the user of the drug delivery device but is nevertheless transmissive for the electromagnetic radiation of step C) to an extent sufficient to soften the second work piece part.

In another embodiment the second work piece part at least partly absorbs the electromagnetic radiation of step C) to an extent sufficient for softening the second work piece part.

For example, if for the first work piece part a part is used which is transmissive for the electromagnetic radiation, the electromagnetic radiation radiates through the first work piece part. Therefore, the radiation may reach the surface of the second work piece part which is in contact to the first work piece part. Therefore, the second work piece part may absorb the electromagnetic radiation of step C). By absorbing the electromagnetic radiation to a sufficient extent, the second work piece part may be softened because of the absorption of radiation energy. Preferably, the second work piece part is beginning to soften at that surface in which it is in direct contact with the first work piece part. If the second work piece part absorbs the electromagnetic radiation, it is, for example, heated via the absorbed energy. It is also possible that the second work piece part transfers a part of the energy to the first work piece part. The first work piece part therefore may also be softened. This may even be the case when the first work piece part itself does not absorb the electromagnetic radiation to a extent, which would take alone not be sufficient for softening the first work piece part.

In another embodiment for the first work piece part and/or for the second work piece part a part is used which has a tubular or semi-tubular form respectively.

A tubular form preferably may be understood as a macroscopic form of the parts which may additionally have other features, for example wholes, protrusions or threads. A semi-tubular form should preferably be understood as a part that is formed such that when two semi-tubular parts are being joined together a composite part is formed that has a tubular form. The semi-tubular parts may have the form of a channel, for example. Also, the semi-tubular form should preferably be understood as a macroscopic form. These semi-tubular parts may also have the additional geometric structures which have been mentioned before in the context of the tubular form.

Preferably, the first work piece part and/or the second work piece are parts of a drug delivery device, in particular of a pen-type device like an injection pen. A pen-type device and, in particular, a pen-type injector, may comprise one or a plurality of sleeves. The tubular shape of the respective sleeve may be especially suitable for forming the respective work piece.

In another embodiment in step B) the second work piece part is introduced at least partly into the first work piece part, whereby both parts are brought into mechanical contact with one another in the contact area.

For example in the case that both parts have a tubular form, the second work piece part may be introduced partly into the first work piece part, in particular a hollow space thereof. In this case, the minimum inner diameter of the first work piece part matches or is less than the maximum outer diameter of the second work piece part.

In another preferred embodiment, the first work piece part may be introduced partly into the second work piece part, in particular a hollow space thereof. In this case, the minimum inner diameter of the second work piece part matches or is less than the maximum outer diameter of the first work piece part. In this embodiment, the electromagnetic irradiation may preferably be emitted from a hollow space inside of the first work piece part, the electromagnetic irradiation preferably being directed essentially radially outward. This embodiment has the advantage of showing minimal optical flaws at the visible outer surface of the second work piece part.

In another embodiment the contact area is only a sub-area of the total area in which the first work piece part and the second work piece part overlap in step B). Preferably the second work piece part has a protrusion which may define the contact area.

For example, if both elements have a tubular form and the second work piece part is introduced in the first work piece part, only a sub-area of the area in which both parts overlap has the necessary outer diameter to form a contact area with respect to the first work piece part. The remaining area, which also overlaps with the first work piece part but does not form the contact area, may have, for example, a smaller outer diameter compared to the area of the second work piece part which forms the contact area.

In another embodiment a part is used for the first work piece part which is impervious for the electromagnetic radiation of step C) and at least partly absorbs the electromagnetic radiation of step C) preferably to an extent sufficient for softening the first work piece part and/or the second work piece part.

In this embodiment the electromagnetic radiation of step C) may not pass through the first work piece part. Rather, the first work piece part is able to absorb the electromagnetic radiation, for example at its surface which is irradiated. Energy which is absorbed at the surface of the first work piece part, for example, may be transferred and distributed through the whole first work piece part. It is also possible that the energy is transferred through the whole first work piece part up to the second work piece part. Therefore, embodiments are possible in which, for example, the second work piece part has a lower melting point compared with the first work piece part, the second work piece part being softened by heat transferred to the second work piece part through the whole first work piece part from the irradiation. The first work piece part may also be softened on account of the irradiation. There are also embodiments possible in which only the first work piece part is softened by the electromagnetic radiation of step C).

In another embodiment the first work piece part and/or the second work piece part comprises a spring member.

The first work piece part and the second work piece part may for example be formed as spring members, for example in a semi-tubular form. Thus, if the first work piece part and the second work piece part are arranged according to step B) they may form a tube for example. The second work piece part may for example be partly introduced into the first work piece part and may apply pressure on the outer surface of the first work piece part in the contact area. Thereby, both elements are put under and preferably hold in elastic stress after step B). In particular, the joined of the first work piece part and the second work piece part may be strengthened as the elastic force may press both work piece parts together. In this way, provision of a reliable composite work piece may be facilitated.

In another embodiment a laser is used for the irradiation of the surface of the first work piece part in step C).

Laser radiation is advantageous for achieving a reliable connection of the two work piece parts. A laser may have a small beam diameter. Accordingly, a laser is particularly suitable for generate small laser welds, which may be stable despite a small area.

In this case the wavelength of the laser which is used for the irradiation in step C) may be matched for example to the material of the first work piece part.

In another embodiment the composite work piece is formed during production of a drug delivery device, which is an injection pen.

Members, preferably tubular members, of the injection pen may be especially suited to be joined by the above described method to form the composite work piece.

In this case the drug delivery device is a device which for example may be used for injection of a liquid for example into the human body.

In another embodiment the first work piece part and the second work piece part are chosen in a way that they both comprise a plastic.

Plastics have the advantage compared to metal that they usually have a lower density so that the composite work piece manufactured out of the plastic parts may have a lower weight compared to a work piece which is made out of metal. Another advantage of a plastic part is that the plastic may usually be softened or melted at lower temperatures, compared for example to metal parts. One more advantage is that plastic parts may normally be manufactured more cost efficiently than metallic parts.

In another embodiment the first work piece part and/or the second work piece part comprise a metal.

If the first work piece part and the second work piece part comprise a metal, both parts are more robust against external or internal forces, hence both parts may be applied to stronger forces.

Beside the method for manufacturing a composite work piece for the drug delivery device, the composite work piece itself is also disclosed herein. Features disclosed herein in connection with the method may also apply to the work piece and vice versa.

According to an embodiment, a method for manufacturing a drug delivery device is provided. The method may comprise joining a first work piece part and a second work piece part according to the previously described method.

In this way, provision of a reliable drug delivery device may be facilitated.

In an embodiment a composite work piece for a drug delivery device comprises: a first work piece part. The composite work piece may comprise a second work piece part. The first work piece part and the second work piece part may be in mechanical contact with one another in a contact area. The contact area may comprise a weld. The weld may, preferably permanently, connect the first work piece part to the second work piece part. The contact area may comprise an unwelded sub-area adjacent to the weld.

A composite work piece for the drug delivery device may therefore comprise a contact area, which comprises a weld on the one hand which permanently connects the first to the second work piece part and on the other hand, a sub-area in the contact area in which the first work piece part and the second work piece part are not welded with each other. In this sub-area, which is adjacent to the weld and may be located circumferentially around the weld, the first part and the second part may be under elastic residual stress and apply pressure on each other. A residual elastic restoring force, which is exerted by one of the work piece parts onto the other one of the work piece parts on account of a residual elastic deformation of one the work piece parts, may exist between the two work piece parts.

A contact area as described may for example be the result of a welding process in which only a small area of the contact area was locally heated. So the energy should have been applied to the contact area by a manufacturing process, which is suitable to transfer the energy to a small and pre-defined area. In the sub-area in which the first work piece part and the second work piece part are not welded both parts may still be under the elastic stress like, for example, the whole contact area was before the welding process.

According to an embodiment, a drug delivery device is provided. The device may comprise one, or two, or more of the previously described composite work pieces.

Respective members and/or parts of members of the device may be joined, preferably permanently joined, to form the respective composite work piece. In this way, provision of a reliable drug delivery device is facilitated.

According to an embodiment, the drug delivery device is a pen-type device.

A pen-type device may comprise at least one, preferably two or more sleeves. These sleeves may be especially suited to be joined for forming a respective composite work piece.

According to a preferred embodiment, a method for manufacturing a composite work piece for a drug delivery device is provided, comprising the steps:

A) providing a first work piece part and a second work piece part,

B) arranging both work piece parts with respect to each other in such a way that both work piece parts are in mechanical contact with one another in a contact area, C) irradiating a surface of the first work piece part with electromagnetic radiation, thereby softening the first work piece part and/or the second work piece part in a region adjacent to the contact area, and D) joining the first work piece part to the second work piece part in the contact area for the composite work piece.

According to a preferred embodiment, a composite work piece for a drug delivery device is provided comprising:

a first work piece part, a second work piece part, wherein the first work piece part and the second work piece part are in mechanical contact with one another in a contact area, the contact area comprises a weld, which permanently connects the first work piece part to the second work piece part, and the contact area comprises an unwelded sub-area adjacent to the weld.

The following figures are for illustrating some embodiments of the composite work piece and of the method from manufacturing the composite work piece.

Figure 1B:
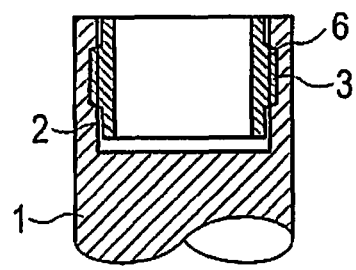
Figure 1C:
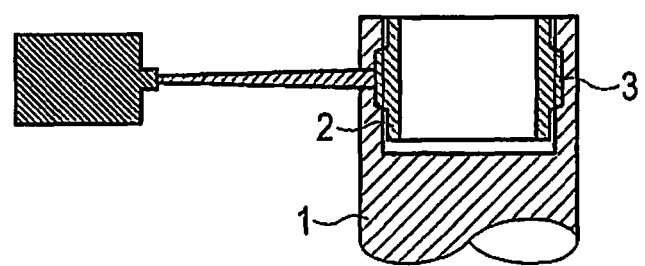
Figure 2A:
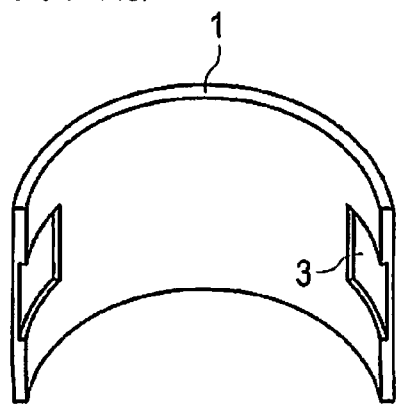
Figure 2B:
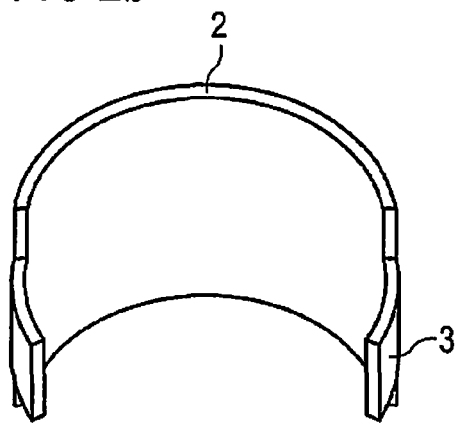
Figure 2C:
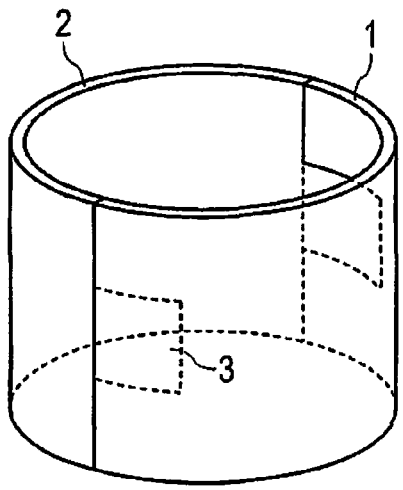
Figure 2D:
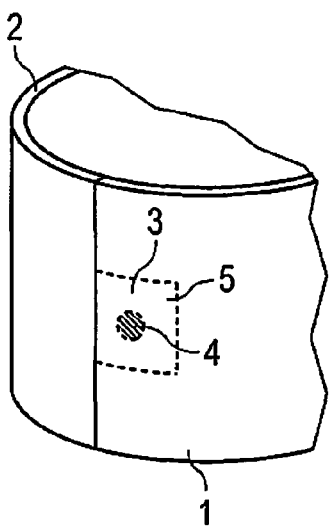
Figure 3:
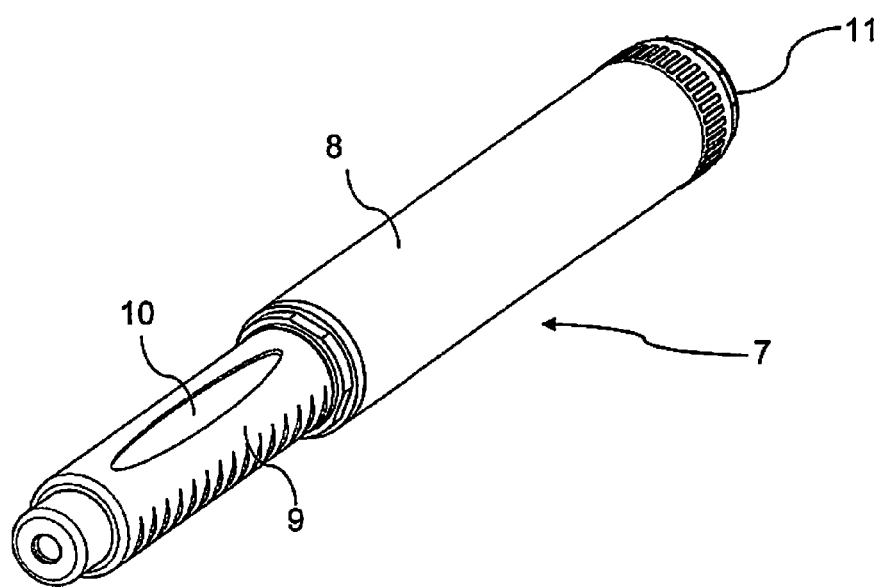

FIGS. 1a-c show in a schematic cross section three different steps of the manufacturing process of one embodiment of the composite work piece, FIGS. 2a-d show a schematic cross section of four different steps of the manufacturing process of another composite work piece, FIG. 3 shows an exemplary embodiment of a drug delivery device.

FIG. 1a schematically shows the cross section of a first work piece part 1 and a second work piece part 2. Both parts 1, 2 have a tubular or sleeve-like form in this embodiment. The first work piece part 1, which may be circumferentially closed, is shown schematically with a window that allows to view the inside of it, which may be a hollow. The window may be present in the first work piece part 1 or may be for allowing to view the inside of the part 1 for illustration purpose only.

In this embodiment, the second work piece part 2 has a constant inner diameter. The outer diameter of the second work piece part 2 may vary. The second work piece part 2 comprises one or more protrusions 6 at its outer surface. The respective protrusion 6 may be a flange or the protrusions 6 may comprise one or more protruding ribs. Therefore, the outer diameter of the second work piece part 2 is greater in the section with the protrusion 6 than in other sectors with respect to the top and bottom of the part 2. The section with the protrusions 6 may be a central or mid section of the first work piece part 1. The outer diameter at the bottom and at the top of the second work piece part 2 is smaller compared to the central section.

FIG. 1b shows a schematic cross section for example for the method step B) as described previously. The first work piece part 1 and the second work piece part 2 are now arranged with respect to each other for being joined by introducing the second work piece part 2 into the first work piece part 1. Both parts 1, 2 are in contact with another in the contact area 3. In this embodiment the contact area 3 is only a sub-area of the overlap between the first work piece part 1 and the second work piece part 2. The outer diameter of the second work piece part 2 is greater in the area of the protrusions 6 than the inner diameter of the first work piece part 1. Therefore an external force is required to push the second work piece part 2 into the first work piece part 1. The outer diameter of the protrusions 6 is matched to the inner diameter of the first part 1 in a way that the second work piece part 2 can be introduced into the first work piece part 1 and, additionally, that the two parts 1, 2 are pressed to each other by an elastic restoring force in the contact area. This force is exerted by the work piece parts 1, 2 onto one another, in general on account of a residual elastic deformation of one of the work piece parts 1, 2 or both work piece parts in the contact area 3. In the area of the outer surface of the second work piece part 2 with the smaller outer diameter the first work piece part 1 and the second work piece part 2 are not under elastic stress. In this area there may be no force pressing the two work piece parts 1, 2 against each other.

FIG. 1c shows a schematic cross section of another manufacturing step which may be step C) as previously discussed for example. In this manufacturing step the surface of the first work piece part 1 is irradiated by a laser beam. The laser passes through the first work piece part 1 and reaches the second work piece part 2. The laser radiation may be absorbed in the second work piece part 2. The laser may be focused on an area of the surface of the first work piece part 1 so that it impacts the second work piece part 2 in the contact area 3 after passing through the first work piece part 1. So, the energy of the laser beam may be absorbed by the second work piece part 2. The absorbed energy may now soften the surface of the second work piece part 2, which is in direct contact with the first work piece part 1. The second work piece part 2 may be heated through the absorbed laser energy and the heat may be transferred to the first work piece part 1, so that also the first work piece part 1 may be softened. If both work piece parts 1, 2 are softened until they melt, the materials of the both work piece parts 1, 2 are able to mix.

The laser may be directed only at selected points onto the surface of the first work piece part. Thereby, pointwise welds may be created. It is also possible that the laser is guided around the whole first work piece part 1 in a way, such that a continuous weld is formed which may run circumferentially around the former second work piece part 2 in the contact area 3.

Because of the elastic restoring force which presses the first work piece part 1 and the second work piece part 2 against each other before they have been softened, no additional external force is necessary to achieve a good joining strength between the first work piece part 1 and the second work piece part 2. Therefore, a good joining is possible, for example just by softening one or two or more points in the contact area 3 and curing the softened material. After curing, the first work piece part 1 and the second work piece part 2 are now permanently and firmly connected in a way that the connection is resistant to mechanical stress.

FIG. 2a shows a schematic cross section of another embodiment of the first work piece part 1. In this embodiment the first work piece part 1 is a spring member with a semi-tubular form. The spring member has a section provided for forming the contact areas 3 at the left and at the right end in the inner side of the first work piece part 1. The first work piece part 1 may be part of a drug delivery device 7 (see FIG. 3), e.g. part of a housing sleeve 8 of the device 7.

FIG. 2b shows a schematic cross section of an embodiment of the second work piece part 2. Also the second work piece part 2 is a spring member. As compared to the first work piece part 1 which is shown in FIG. 2a it additionally comprises two wings at opposing ends of the spring member. These two wings, especially the outer surface of these two wings, are matched in a way to the first work piece part 1 that they may get into connection with the first part and form the contact area 3 at the outer side of the wings. The second work piece part 2 may be part of the drug delivery device 7 (see FIG. 3), in particular an other part of the housing sleeve 8 of the device 7.

FIG. 2c shows a schematic cross section of a composite work piece which may be manufactured for example by arranging the first work piece part 1 which is shown in FIG. 2a and the second work piece part 2 which is shown in FIG. 2b with respect to each other in a way that they form a tube. Both parts 1, 2 are arranged in this embodiment so that the wings of the second work piece part 2 are introduced into the first work piece part 1, for example in corresponding slots thereof, and that the outer side of the respective wing is in contact with the inner surface of the first work piece part 1. The wings of the second work piece part 2 and the corresponding area at the inner surface of the first part 1 are pressed on each other by a force, which may be an elastic restoring spring force.

FIG. 2d shows a schematic cross section of another embodiment of the composite work piece after an additional manufacturing step. In this embodiment the first work piece part 1 has been irradiated with electromagnetic radiation, for example by a laser, in a pre-determined preferably small area of the outer surface of the first work piece part 1. This surface is located on the opposite side from the inner surface of the first work piece part 1 which is in contact with the wings of the second work piece part 2. The energy of the laser beam is absorbed by the first work piece part 1, whereby the first work piece part 1 is softened in a sub-area of the contact area 3. After hardening a weld 4 was formed in the contact area 3, which weld 4 now permanently connects the first work piece part 1 with the second work piece part 2. The weld 4 does not occupy the whole contact area 3 such that there is a sub-area 5 of the contact area 3 left adjacent to the weld 4, in which both parts 1, 2 are not welded to each other. In this sub-area 5, both parts 1, 2 may be still under elastic stress because of the elastic restoring force and, thus, may apply pressure on each other.

In an alternative embodiment, a first work piece part may be introduced partly into a second work piece part, in particular a hollow space thereof. In this case, the minimum inner diameter of the second work piece part matches or is less than the maximum outer diameter of the first work piece part.

In this embodiment, the electromagnetic irradiation is emitted from a hollow space inside of the first work piece part, the electromagnetic irradiation being directed essentially radially outward.

FIG. 3 shows exemplary embodiment of a drug delivery device 7. The drug delivery device 7 may comprise one or more composite work pieces (not explicitly shown) formed as described in connection with FIGS. 2a through 2d, for example.

The drug delivery device 7 may be an injection device. The drug delivery device 7 may be a pen-type device, in particular a pen-type injector. The device 7 may be a disposable or a re-usable device. The device 7 may be configured to dispense fixed doses of a drug, in particular doses which may not be varied by the user, or variable, preferably user-settable, doses of the drug. The drug delivery device 7 may be a manually, in particular a non-electrically, driven device.

The drug delivery device 7 comprises a housing 8. The housing 8 comprises a tubular shape. In particular, the housing 8 may comprise or may be embodied as a sleeve. The housing 8 is configured to house members of the drug delivery device 7, e.g. a guide member (not explicitly shown), a drive member (not explicitly shown) and/or a dose member 11. Preferably, these members comprise a tubular shape. In particular, these members may comprise or may be embodied as a sleeve. The tubular shape of the respective members of the device 7 makes these members especially suitable for acting as the first work piece part and/or the second work piece part and, hence, for being joined forming the previously described composite work pieces. In particular, the housing sleeve 7 may comprise a composite work piece formed by the joined of a first housing part and a second housing part (not explicitly shown). Additionally or alternatively, the dose member 11 may comprise a composite work piece.

Furthermore, the device 7 may comprise the previously mentioned guide member, in particular a guide sleeve (not explicitly shown). This member may be arranged inside the housing 8. In particular, the guide sleeve may be permanently secured to the housing 8, in particular secured against axial and rotational movement with respect to the housing. The housing 8 may, in this case, form a first work piece part. The guide member may form a second work piece part. The permanent joined connection of the housing 8 and the guide member may comprise a composite work piece of the device 7.

The drug delivery device 7 comprises a cartridge holder 9. The cartridge holder 9 is connected, preferably releasably connected, to the housing 8 of the device 7. The device 7 comprises a cartridge 10. The cartridge 10 is retained in the cartridge holder 9. The cartridge holder 9 stabilizes the cartridge 10 mechanically. The cartridge 10 may hold a plurality of doses of a drug. The term "drug", as used herein, preferably means a pharmaceutical formulation containing at least one pharmaceutically active compound, wherein in one embodiment the pharmaceutically active compound has a molecular weight up to 1500 Da and/or is a peptide, a protein, a polysaccharide, a vaccine, a DNA, a RNA, a antibody, an enzyme, an antibody, a hormone or an oligonucleotide, or a mixture of the above-mentioned pharmaceutically active compound.

In a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis.

In a further embodiment the pharmaceutically active compound comprises at least one peptide for the treatment and/or prophylaxis of diabetes mellitus or complications associated with diabetes mellitus such as diabetic retinopathy.

In a further embodiment the pharmaceutically active compound comprises at least one human insulin or a human insulin analogue or derivative, glucagon-like peptide (GLP-1) or an analogue or derivative thereof, or exedin-3 or exedin-4 or an analogue or derivative of exedin-3 or exedin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivatives are for example B29-N-myristoyl-des (B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyheptadecanoyl) human insulin.

Exendin-4 for example means Exendin-4(1-39), a peptide of the sequence H-His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser-Ser-Gly-Ala-Pro-Pro-Pro-Ser-NH2.

Exendin-4 derivatives are for example selected from the following list of compounds:

H-(Lys)4-des Pro36, des Pro37 Exendin-4(1-39)-NH2,
H-(Lys)5-des Pro36, des Pro37 Exendin-4(1-39)-NH2,
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39),
wherein the group -Lys6-NH2 may be bound to the C-terminus of the Exendin-4 derivative;
or an Exendin-4 derivative of the sequence
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(O2)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4(1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4(1-39)-(Lys)6-NH2,
H-(Lys)6-des Pro36, Pro37, Pro38 [Met(O)14, Asp28] Exendin-4(1-39)-(Lys)6-NH2, H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(O2)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp (O2)25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2) 25, Asp28] Exendin-4(S1-39)-(Lys)6-NH2,
H-Asn-(Glu)5-des Pro36, Pro37, Pro38 [Met(O)14, Trp (O2)25, Asp28] Exendin-4(1-39)-(Lys)6-NH2;
or a pharmaceutically acceptable salt or solvate of any one of the afore-mentioned Exedin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

REFERENCE NUMERALS 1) first work piece part
2) second work piece part
3) contact area
4) weld
5) unwelded sub-area
6) protrusion
7) drug delivery device
8) housing
9) cartridge holder
10) cartridge
11) dose member

The invention claimed is:
1. A method for manufacturing a composite work piece for a drug delivery device, comprising the steps:

A) providing a first work piece part and a second work piece part, the first work piece part and the second work piece part being chosen in a way that they both comprise a plastic,
wherein the first work piece part comprises a semi-tubular shaped spring comprising a first and a second slot contact area,
and the second work piece part comprises a semi-tubular shaped spring comprising a first and second wing,
B) arranging both work piece parts with respect to each other in such a way that both work piece parts are in mechanical contact with one another in a contact area by an elastic force that is exerted by one of the work piece parts on the other one of the work piece parts by way of an elastic deformation,
such that the first and second wings of the second work piece part are pressed on the first and second slot contact areas of the first work piece part, respectively, by the elastic force,
C) irradiating a surface of the first work piece part with electromagnetic radiation, thereby softening the first work piece part and/or the second work piece part in a sub-area of the contact area, and
D) joining the first work piece part to the second work piece part in the contact area for the composite work piece, such that, after completing the step of joining the first work piece part to the second work piece part, the contact area comprises (i) a weld, which permanently connects the first work piece part to the second work piece part and (ii) an unwelded sub-area adjacent to the weld, wherein in the unwelded sub-area the first and the second part are under elastic residual stress, wherein a residual elastic restoring force is exerted by one of the works piece parts onto the other one of the work piece parts on account of a residual elastic deformation of one of the work piece parts,
wherein for the first work piece part a part is used which is impervious for the electromagnetic radiation of step C) and absorbs the electromagnetic radiation of step C) to an extent sufficient for softening the first work piece part and/or the second work piece part.

2. Method according to claim 1, wherein in step B) the work piece parts are connected to one another via a force-fit connection.

3. Method according to claim 1, wherein the first work piece part comprises a black pigment.

4. Method according to claim 1, wherein in step B) the second work piece part is introduced at least partly into the first work piece part, whereby the work piece parts are brought in mechanical contact with one another in the contact area.

5. Method according to claim 1, wherein a laser is used for irradiating the surface of the first work piece part in step C).

6. Method according to claim 1, wherein the composite work piece is formed during production of a drug delivery device, the device being an injection pen.

7. Method for manufacturing a drug delivery device comprising joining a first work piece part and a second work piece part according to the method of claim 1.

8. A method for manufacturing a composite work piece for a drug delivery device, comprising the steps:

A) providing a first work piece part and a second work piece part,
B) arranging both work piece parts with respect to each other in such a way that both work piece parts are in mechanical contact with one another in a contact area,
C) irradiating a surface of the first work piece part with electromagnetic radiation, thereby softening the first work piece part and/or the second work piece part in a region adjacent to the contact area, wherein a surface of the first work piece part is irradiated which is on that side of the first work piece part remote from the second work piece part, and
D) joining the first work piece part to the second work piece part in the contact area for the composite work piece,
wherein for the first work piece part a part is used which is impervious for the electromagnetic radiation of step C) and absorbs the electromagnetic radiation of step C) to an extent sufficient for softening the first work piece part and/or the second work piece part.

9. The method of claim 8, wherein before step C) and after step B), the first work piece part and the second work piece part are held in mechanical contact with each other in the contact area by a force.

10. The method of claim 9, wherein the force is an elastic restoring force, which is exerted by one of the work piece parts onto the other one of the work piece parts on account of a residual elastic deformation of one of or both of the work piece parts.

11. A drug delivery device comprising:
a composite work piece, wherein the composite work piece comprises:
a first work piece part, wherein the first work piece part is impervious to an electromagnetic radiation,
a second work piece part,
wherein the first work piece part comprises a semi-tubular shaped spring comprising a first and a second slot contact area,
and the second work piece part comprises a semi-tubular shaped spring comprising a first and second wing,
wherein the first work piece part and the second work piece part are in mechanical contact with one another in a contact area by an elastic force that is exerted by one of the work piece parts on the other one of the work piece parts by way of an elastic deformation,
such that the first and second wings of the second work piece part are pressed on the first and second slot contact areas of the first work piece part, respectively, by the elastic force,
wherein the contact area comprises a weld, which permanently connects the first work piece part to the second work piece part,
and wherein the contact area comprises an unwelded sub-area adjacent to the weld,
wherein in the unwelded sub-area the first and the second part are under elastic residual stress,
wherein a residual elastic restoring force is exerted by one of the work piece parts onto the other one of the work piece parts on account of a residual elastic deformation of one of the work piece parts.

* * * * *